(No Model.)
C. H. EGGLESTON.
TWO WHEELED VEHICLE.
No. 379,211. Patented Mar. 13, 1888.
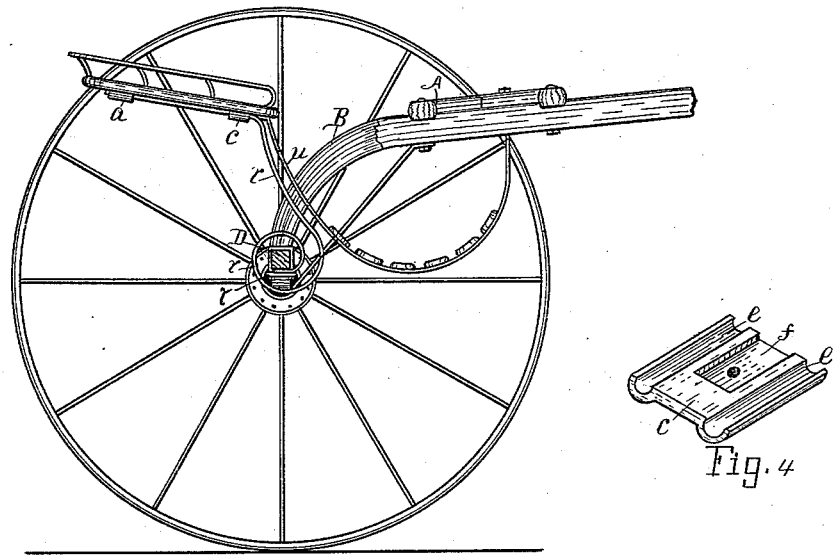
Fig.1
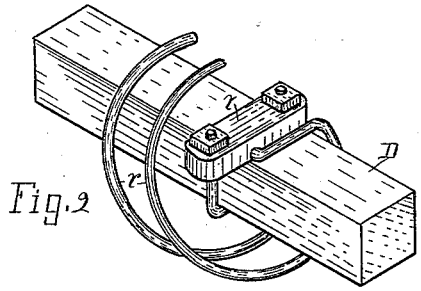
Fig.2
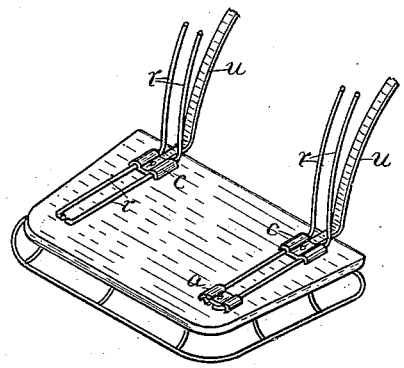
Fig.3
Fig.4
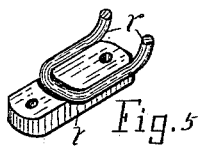
Fig.5
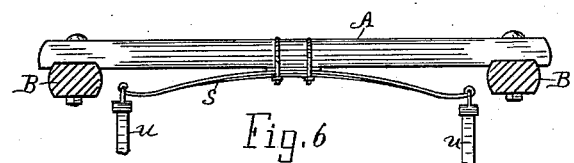
Fig.6
Witnesses,
John C. Perkins
Byron J. Healy
Inventor
Charles H. Eggleston
By Lucius C. West
atty

UNITED STATES PATENT OFFICE.

CHARLES H. EGGLESTON, OF MARSHALL, MICHIGAN.

TWO-WHEELED VEHICLE.

SPECIFICATION forming part of Letters Patent No. 379,211, dated March 13, 1888.

Application filed July 8, 1887. Serial No. 243,751. (No model.)

*To all whom it may concern:*

Be it known that I, CHARLES H. EGGLESTON, a citizen of the United States, residing at Marshall, county of Calhoun, State of Michigan, have invented a new and useful Two-Wheeled Vehicle, of which the following is a specification.

This invention has for its object certain improvements in that class of two-wheeled vehicles the body or seat of which is elastically supported over the axle.

In the drawings forming a part of this specification, Figure 1 is a side elevation with one wheel and a portion of one thill removed; Fig. 2, an under perspective view of a portion of the vehicle-axle and connected parts enlarged from Fig. 1; Fig. 3, an under perspective of the seat and connected parts in Fig. 1; Fig. 4, an under perspective of a lettered detail in Fig. 3 enlarged; Fig. 5, a perspective of lettered details in Fig. 2, showing the other side of them; and Fig. 6 is a cross-section of the thills near the cross-bar A, showing a change.

Referring to the lettered parts on the drawings, $r$ is a spring made from a spring-metal rod folded upon itself. The loop end fits against the axle D and in a transverse groove of the clip-plate $t$, which binds it to the axle. From the axle the two parallel bars curve around the axle, thence upward and rearward to the seat, and thence back beneath and fitting to the seat, with the rear ends bent inward toward each other. These ends are attached to the seat by plates $a$ $c$, bolted or otherwise secured to the seat. These plates have grooves in each side, as at $e$ $e$ in Fig. 4, fitting over the ends of the parallel bars beneath the seat, Fig. 3. The seat may be adjusted forward or back by changing the position of these plates.

The body-bars $u$ $u$, of spring metal, are rigidly attached to the thills B, or else to the cross-bar A; or they may be coupled to the ends of the half-elliptic spring S, which spring S is centrally attached to the cross-bar A, as in Fig. 6, thus giving greater elasticity to the forward end of the body.

The upper rear ends of the bowed body-bars $u$ are passed into a mortise, $f$, of the plates $c$, and the bolt or rivet which attaches the plate $c$ to the seat can pass through the end of the bar $u$, and preferably so, as indicated by the hole through the plate, as in Fig. 4. When the bars $u$ are loosely coupled to the ends of spring S, or if loosely attached to the thills or thill cross-bar, it will not be necessary that the bars $u$ be made from spring metal.

Having thus described my invention, what I claim is—

1. In combination with the thills, axle, body, and seat of a two-wheeled vehicle, springs made from a single piece of spring metal bent upon itself, attached to the axle at one end, having the spiral portion around the axle and the rear upper straight portion attached to the seat, substantially as set forth.

2. In combination, the axle, thills, seat, the spring-metal body-bars, and the springs made of elastic rods bent upon themselves and attached to the axle and seat, substantially as set forth.

3. In combination, the axle, thills, seat, and body of a two-wheeled vehicle, with the spring-metal rods bent upon themselves, the grooved clip-plates clamping the loop ends to the axle, the upper ends passed beneath the seat, and the plates having the grooved sides, attaching the upper ends to the seat, substantially as set forth.

In testimony of the foregoing I have hereunto subscribed my name in presence of two witnesses.

CHARLES H. EGGLESTON.

Witnesses:
   HENRY G. M. HOWARD,
   SAMUEL FOLZ.